Figure 1:
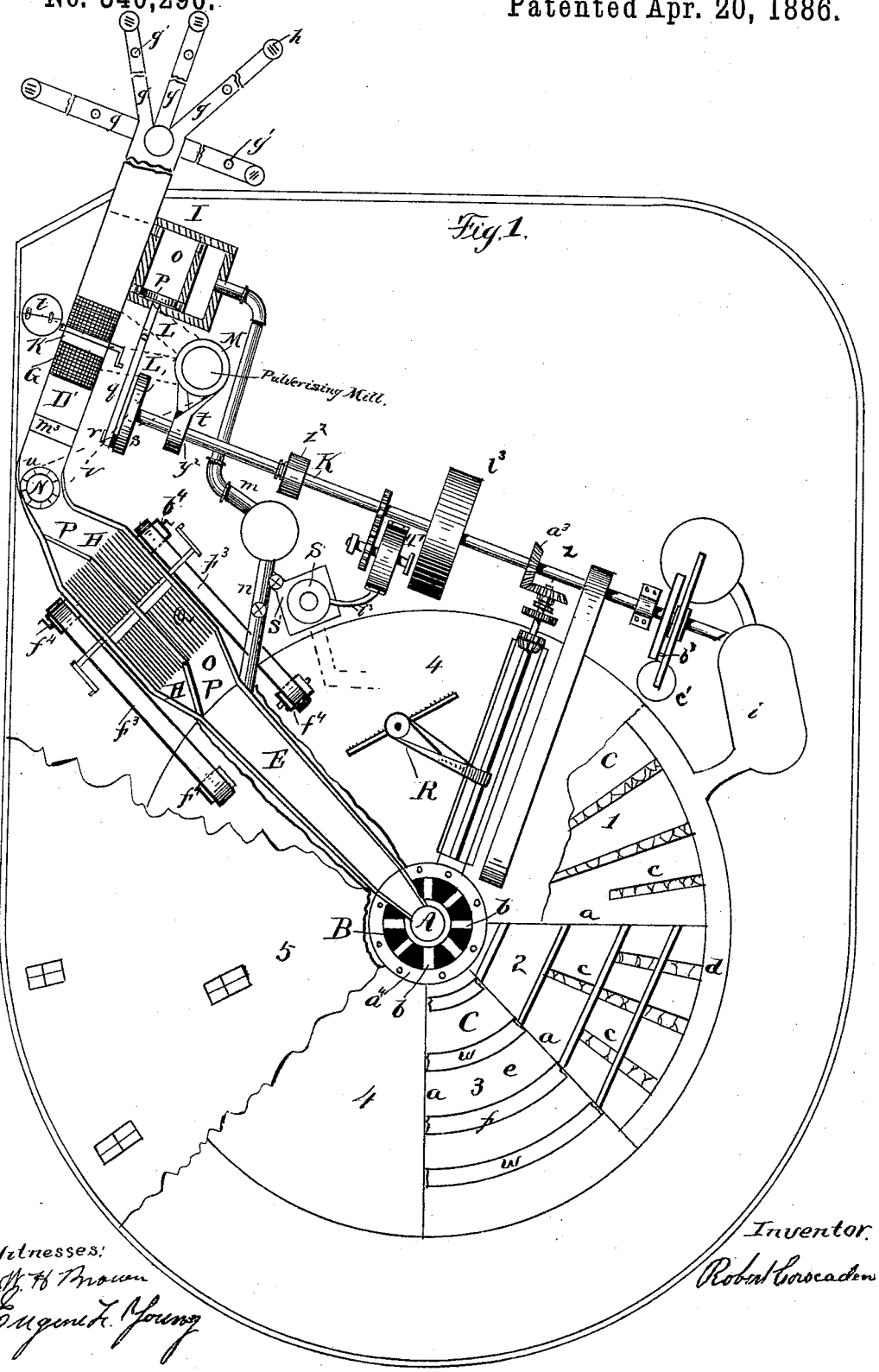

(No Model.)

4 Sheets—Sheet 1.

R. CORSCADEN.
APPARATUS FOR COLLECTING AND DRYING SEDIMENTARY MATTER OF SEWAGE, &c.

No. 340,290.  Patented Apr. 20, 1886.

Witnesses:

Inventor,
Robert Corscaden (No Model.) 4 Sheets—Sheet 2.
R. CORSCADEN.
APPARATUS FOR COLLECTING AND DRYING SEDIMENTARY MATTER OF SEWAGE, &c.
No. 340,290. Patented Apr. 20, 1886.
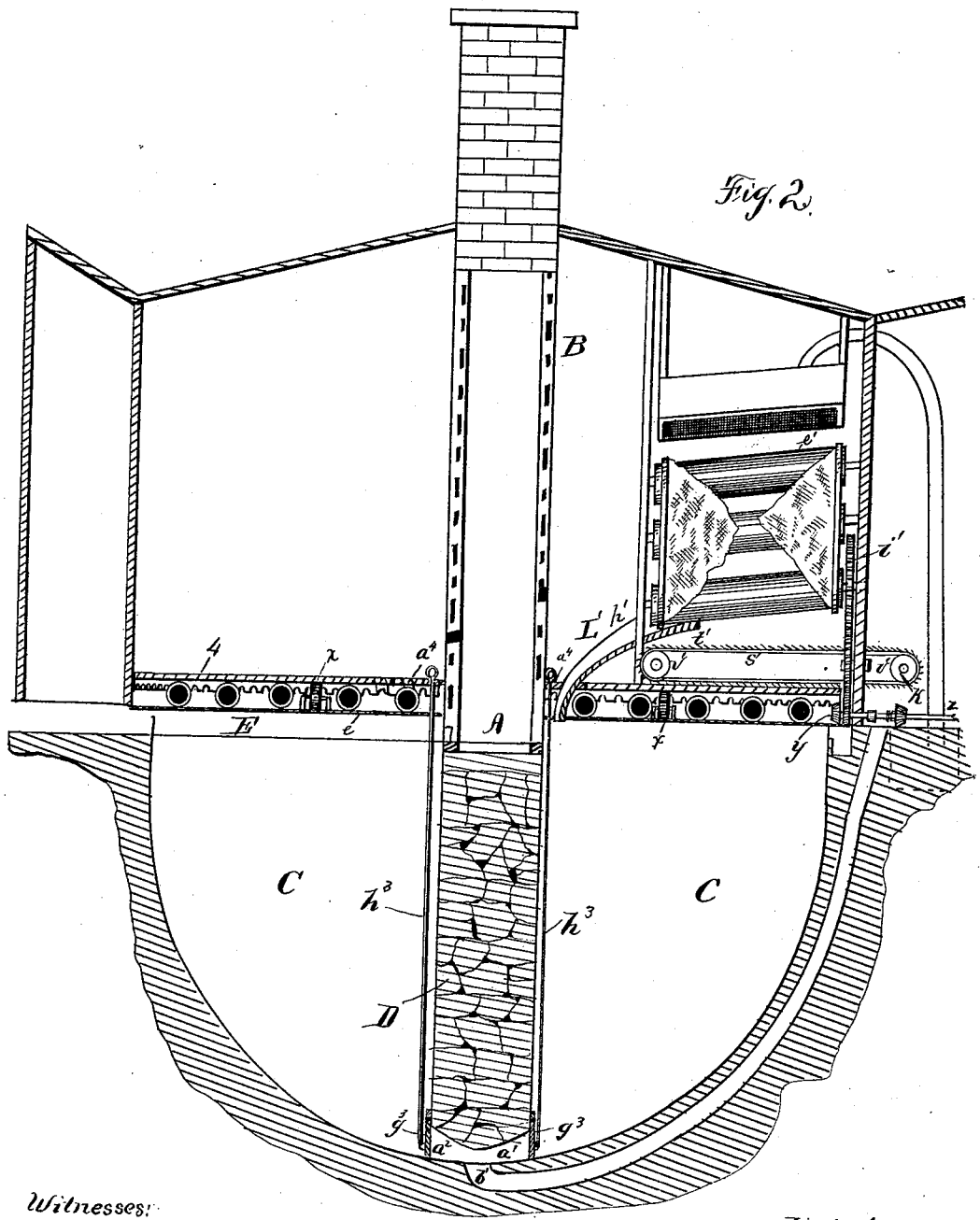
Witnesses:
C. W. H. Brown
Eugene F. Young
Inventor:
Robert Corscaden

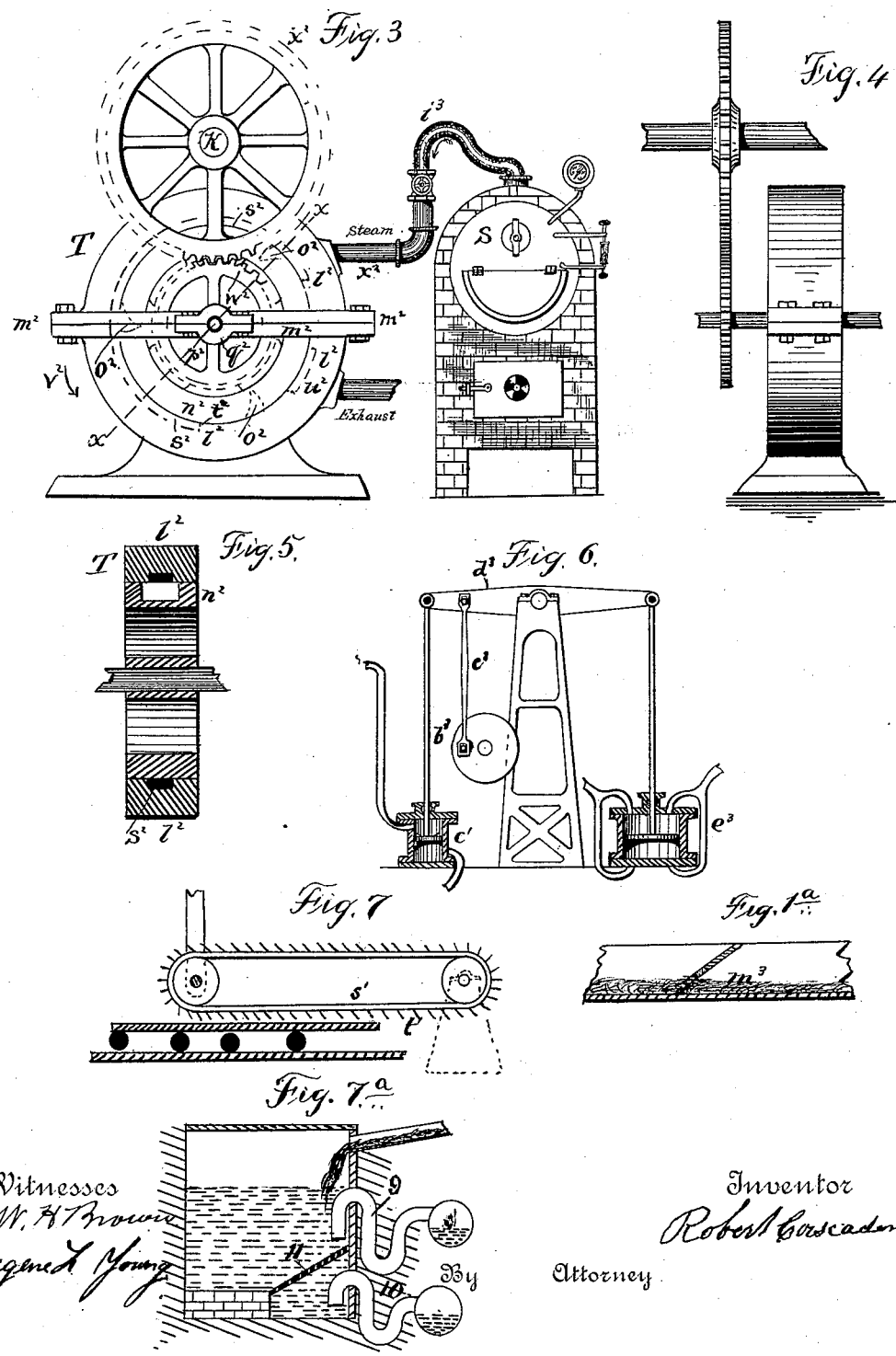

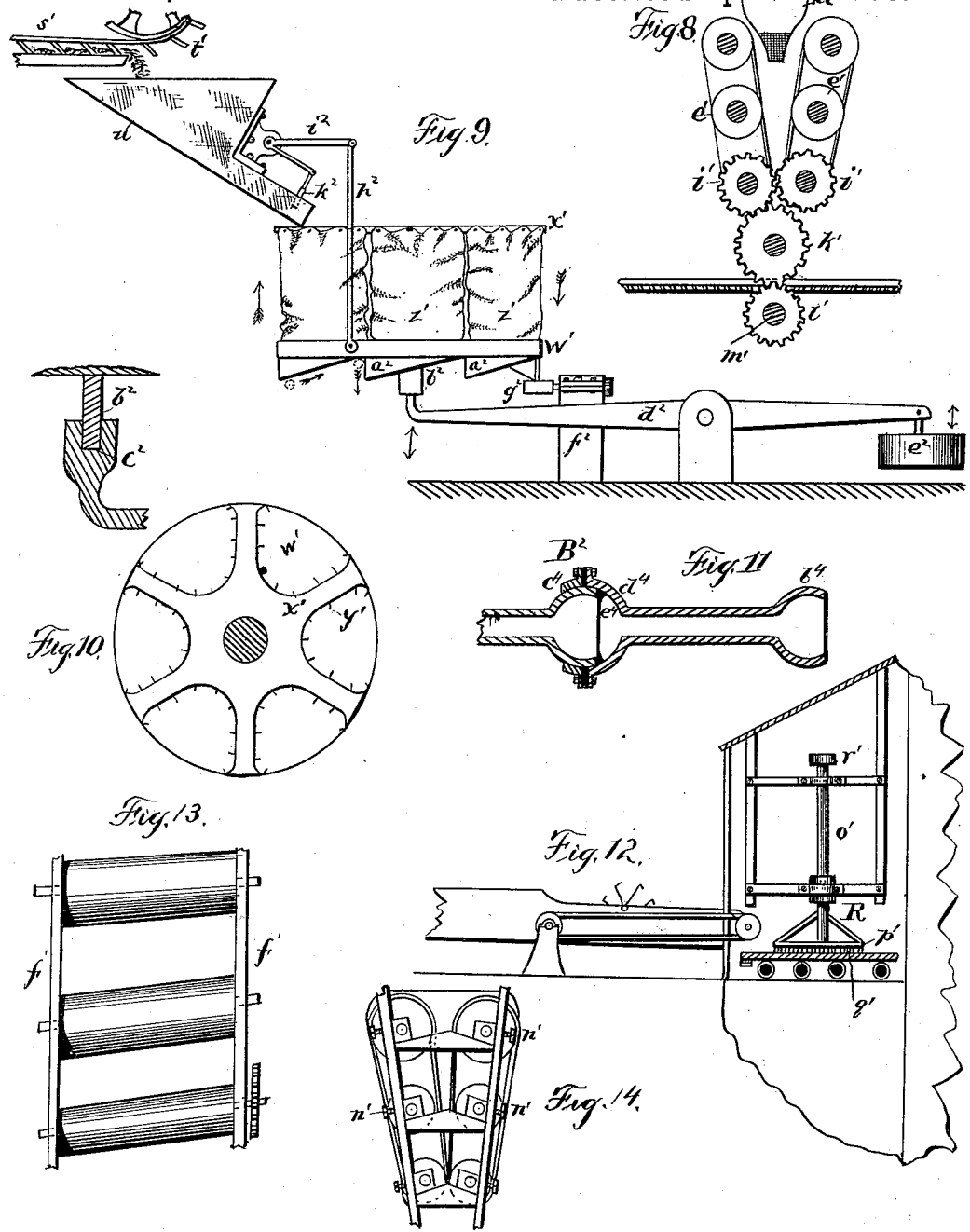

UNITED STATES PATENT OFFICE.

ROBERT CORSCADEN, OF PROVIDENCE, RHODE ISLAND.

APPARATUS FOR COLLECTING AND DRYING SEDIMENTARY MATTER OF SEWAGE, &c.

SPECIFICATION forming part of Letters Patent No. 340,290, dated April 20, 1886.

Application filed February 3, 1886. Serial No. 190,745. (No model.)

*To all whom it may concern:*

Be it known that I, ROBERT CORSCADEN, a citizen of the United States, residing at Providence, in the county of Providence, in the State of Rhode Island, have invented a new and useful Improvement in Apparatus for Collecting and Drying Sedimentary Matter of Sewage and Freeing the Sewers of Gas and Foul Air, (the same being additional to improvements covered by Patents Nos. 315,912 and 331,943, heretofore granted to me, and forming part of my national sewage and fertilizer system,) of which the following is a specification.

My invention relates to an improvement in apparatus for collecting and drying sedimentary matter of sewage and freeing the sewers of gas and foul air; and it consists in the devices hereinafter particularly set forth and claimed.

Reference is had to the accompanying drawings, forming a part of this specification, in which the same letters of reference always indicate the same parts, and in which—

Figure 1 is a plan view of my apparatus, certain parts being in section. Fig. 2 is a vertical section. Figs. 3 to 14 are views of parts in detail.

In general my system comprises a group of precipitating-tanks having communication with a chimney or ventilating-flue common to them all, and into which the sewage passes from the sewer; a heating floor or chamber; a drying-floor; means for depositing the heavy matter of sewage upon the drying-floor, largely freed from its liquid part, and removing it therefrom when properly dried; means for disinfecting the sewage and rendering it practically innocuous; means for drawing and directing the sewer-gases into the ventilating-chimney; and means for discharging the clear liquid sewage. Certain improvements covering these ends may be found fully set forth in my patents above referred to.

My present invention simplifies and perfects the above, as will hereinafter appear.

A, in Fig. 1, represents the lower end of a large flue of a chimney, B, the said chimney being shown in section. The lines *a* radiating therefrom indicate the position of the dividing-walls of a basin having inclined sides, the said walls dividing the cavity into sector shape compartments C. The chimney rises from a central pier, D, springing from the center of the bottom of the basin. I prefer this arrangement, as most compact and convenient, but do not confine myself thereto. The sewer D' connects directly with the said lower part of the chimney by the conduit E, and from said center the sewage is distributed to the compartments or tanks through the openings *b*.

The partial radial lines *c* indicate sections of wall built up in the tanks to the level of the dividing-walls to furnish, with them support for the beams of the floor *e*, which closely covers the basin. Around the basin extends the effluence-drain *d*, which is also covered by the floor, and into which the comparatively clear supernatant liquid flows from the tanks, the heavier sediment being settled. This drain discharges in a reservoir, *i*.

In Fig. 1 the different sections or levels of the structure are shown, 1 indicating one of the tanks or divisions of the basin, with partial walls to receive the floor-beams; 2, another with the floor-beams in position; 3, another covered by the floor *e*, the latter supporting the heating-pipe *f*, to be hereinafter described.

4 indicates a portion of the rotating drying-floor overlying the heating-pipe and covering-floor and other of the tanks, and 5 indicates the portion of the roof of the structure, provided with windows, and covering others of the tanks and adjacent area. It is to be understood that this building and roof extend and cover the entire apparatus in such manner as to close it against free ingress of outside air. Openings are made in the chimney, by which vapors from the interior of the drying-chamber may escape thereinto.

D' represents a sewer and intercepting sewers and branches *g*, provided with air-tight man-holes *g'* and gratings *h* at their termini to admit air to check-valves.

At G, I have shown a filter or gatherer of grease and floating substances. It is constructed somewhat like the filth-hoist in my Patent No. 331,943, above referred to, and reproduced at H in my present Fig. 1. It consists of a shaft mounted in bearings in the sides of the sewers, and provided at its end which passes through the wall of the sewer with means for rotating it. This shaft is provided on opposite sides with curved wings of fine open-work material—such as long metallic blades or bars set very closely together, or wire-netting supported by a backing of curved rods, or finely-perforated sheet metal similarly supported. Upon the shaft where each wing is joined to it is secured a trough, $k$, at a considerable inclination to the level. These wings dip as the shaft is revolved into the surface of the flowing sewage sufficiently to catch and raise therefrom the grease and floating substances of any kind, which falling into the troughs is conducted into a receiver, $l$. Whatever would float upon the surface of the sewage would not be precipitated in the tanks, and would therefore fail of the treatment which the settled matter receives; and it is well known that grease recovered from the sewers by chemical processes may be clarified and rendered into a merchantable tallow.

At I, I have arranged in connection with the upper part of the sewer a pump or blower of large capacity adapted to draw a large volume of air from the sewer and direct it to a tank by the pipe $m$, from which by gates it may be conducted to the boiler-furnace $s'$, or directly into the chimney, at will, as shown in Fig. 1. This pump may be of any suitable construction adapted to the purpose; but I have shown a cylinder, $o$, with the necessary ports and valves, a piston, $p$, and a piston-rod, $q$, connected to the wrist $r$ of a driving-disk, $s$, on the main shaft K.

That the pump may not draw air back from the chimney and basins, I mount in the sewer, between the pump and the basins, a floating valve or gate, $m^3$, the lower portion of which is cork, to prevent such back-draft.

At L, I divert by a channel a limited portion of the liquid sewage to a well, M, in which is placed a mill for reducing chemicals. In this well, or in the liquid flowing through it by the channels L L, the crushed salts are dissolved, forming a strong disinfecting mixture returning to the flowage of the sewer. The mill is driven by a belt, $t$, from the main shaft K, or by any suitable connection.

At N is mounted in bearings in and above the sewer a vertical shaft carrying a horizontal wheel, $u$, to which are affixed vertical paddles or stirrers, which, by a belt-connection, $v$, from the mill, are caused to rotate in the current of the sewage to mix the liquid and the sediment and the chemical solution thoroughly together.

At O the sewer is divided by one or more walls into a series of passages, and provided with gates P, to swing to close one or more while the other is open, and these passages are provided with filth-hoists Q, as described in my former patent. In my present improvement these hoists deliver their load upon the broad running belts $f^3$, mounted upon the rollers $f^4$, and these discharge it upon the drying-floor. (See Figs. 1 and 12.)

Upon the floor $e$, which covers the basins, is arranged the heating-pipe $w$, from the furnace to the chimney, as set forth in my former patent.

In my present invention I make the drying-floor, which is just above the heating-pipes, movable. By means of this the sludge can be delivered upon it from a fixed delivering or dumping device and evenly deposited without the necessity of buckets or cars, and the dried sludge may be likewise removed by a simple device stationed in a single place in the works. The form in which I at present show this is a circular floor, 4, rotating slowly horizontally about the chimney as a center, being supported by rollers or wheels $x$, mounted in bearings upon the fixed floor $e$. Upon its under side, at its periphery, the drying-floor is provided with a rack extending entirely around it and engaging with the clutch-gear $y$ on the shaft $z$, receiving motion from the main shaft K. The pier upon which the chimney is built is perforated at its bottom by channels $a'$, one from each basin, all converging into one channel or pipe, $b'$. These channels are provided with gates $g^3$, which may be operated from above by rods $h^3$, which extend up through a fixed circular section of floor $a^4$ around the chimney and level with the drying-floor. Through these channels the heavy sediment is raised by suitable means, $c'$, (a pump is preferred,) and discharged into a long hopper, $d'$, high above the drying-floor. This hopper has a long narrow slit at its bottom to permit the descent of the sludge between the uppermost of two nearly vertical series of rollers, $e'\ e'$, said series being slightly inclined to each other, and carrying each upon its rollers a broad belt of fine open straining fabric. These belts, with closing boards or panels $f'$ at their side edges, form an elongated hopper with downwardly-moving sides, into which the sludge being delivered from the hopper $d'$ is pressed by the belts and rollers and a large percentage of the liquid forced out of it, and it is delivered from between the two lowest rollers evenly and partially freed from its moisture upon the moving drying-floor beneath. The rollers being arranged at a slight inclination to the horizontal, as shown in Fig. 2, and both rollers and belts being in constant motion, the liquid pressed out flows to the lowermost portion of the belts and is there received by chutes $h'$ and delivered down again through pipes in the fixed circular section $a^4$ into the basin. The rollers and belts are mounted substantially as shown in Figs. 2, 8, 13, and are operated by gears $i'\ i'\ k'\ l'$ from the shaft $z$, and may be adjusted in relative position to each other by the screws $n'$.

At R, in Figs. 1 and 12, I have shown a rotating stirrer carried by a vertical shaft, $o'$, and consisting therewith of a horizontal bar, $p'$, provided with teeth $q'$. Upon the upper part of shaft $o'$ is a pulley, $r'$, by which the stirrer is operated from any convenient part of the running machinery. One or more of such stirrers may be arranged at different places over the drying-floor and working very close thereto, so that by the time the sludge on any part of the drying-floor shall have been carried round nearly a revolution of the floor it will be not only well dried but pulverized also, and be ready to be discharged. For the purpose of discharging it, I provide a belt, $s'$, to traverse over the floor, and by scrapers $t'$, secured to it, to scrape off the dried sludge into a large hopper, $u'$. The said belt is mounted to run over pulleys $v'$ $v'$, as shown in Fig. 2, and is operated by the main shaft K, or suitable gearing therefrom.

Under the hopper $u'$ is arranged a device to hold bags to receive the dried sludge from the hopper. This consists of a large disk, $w'$, with a supporting frame-work, $x'$, with hooks $y'$ to support a peripheral series of bags, $z'$.

Upon the under side of the periphery of the disk $w'$, and following around the margin thereof, is the rack $a^2$, consisting of projections, one side of each of which is inclined and the other vertical. The disk is supported by a central pin or pintle, $b^2$, fitting loosely in a vertical socket, $c^2$, in the end of a counterbalance-lever, $d^2 e^2$. Adjacent to the disk on one side is a post or block, $f^2$, from one side of which projects a pintle and roller, $g^2$, in such relation to the disk as when the latter is in its elevated position to underlie the apex of one of the projections, $a^2$, of the rack. When, now, the filled bag by its weight overcomes the counter-weight $e'$ and causes the disk to descend, the inclined side of the projection, acting upon the roller $g^2$, causes the disk $w'$ to rotate upon its pintle to bring the next bag under its hopper. The rising and falling of the disk also operates, by the rod $h^2$ and lever $i^2$, a gate, $k^2$, in the throat of the hopper to open and close the same, to feed the material to or cut it off from the bags.

S represents a steam-boiler and furnace, of any approved construction.

T represents a rotary motor suitable to furnish power for the entire apparatus.

$i^3$ indicates a steam-pipe from the boiler to the motor. This motor consists of an outer fixed rim or ring, $l^2$, cast in two parts and united by the flanges and bolts $m^2$ $m^2$. Within this rim or ring rotates a wheel, $n^2$, having formed in its large rim the pockets $o^3$. This wheel is mounted on a shaft, $p^2$, supported in bearings $q^2$, formed integral with one of the halves of the rim $l^2$. From a point where the steam-supply pipe $i^3$ enters the rim $l^2$ a central groove or channel, $s^2$, in the interior periphery of said rim starts and extends nearly or about two-thirds the way around said interior periphery to or near the point $t^2$, where it ceases, and the periphery of the rim is blank for a distance a little exceeding the width of the mouth of the pocket along the periphery of the wheel. Beyond this closed or blank part, as at $u^2$, the exhaust-pipe joins it. Between the exhaust-pipe and the steam-pipe the rim is blank or without the channel. Steam being admitted to the pockets in succession at the opening of the steam-pipe, acts to rotate the wheel in the direction of the arrow $v^2$, and each pocket exhausts its steam after passing the first short blank space of the rim. The blank space in the rim between the steam-pipe and the exhaust closes all possible communication and escape of steam from the former to the latter. By this motor the expenditure of steam is small to the amount of power realized.

I do not confine myself to the use of this motor in connection with my apparatus, as engines of a different character may be employed.

Upon the shaft of the wheel $n^2$ a gear, $w^2$, meshes with a spur-gear, $x^2$, upon the main shaft, imparting motion thereto and to the balance-wheel $l^3$ and connected machinery. From the main shaft power is communicated by the disk $s$ and pitman $q$ to the air pump or blower, and by the pulley $y^2$ and belts $t$ $v$ to the mill and the stirrer, as hereinbefore described. A clutch hoisting-drum, $z^2$, is also mounted upon this shaft, for the purpose of handling heavy objects. Upon the same shaft a gear, $a^3$, actuates the shaft $z$ and its connected machinery. In this main shaft also a crank or wrist, $b^3$, is formed, from which a pitman, $c^3$, connects with a walking-beam, $d^3$, which operates from one end the sludge-pump $c'$, which raises the sludge from the basins and pipe $b'$ to the hopper $d'$, and from the other the pump $e^3$, which empties the reservoir $i$ of the effluence drainage or liquid in it.

In Fig. 7$^a$ I have shown a surface-water catch-basin, which siphons all water into the sewer, having S-shaped traps on both the storm-siphon 9 and the rain-water siphon 10.

11 is a shield, which hinders gross matter from falling into the compartment in which the siphon is placed. A wire-netting also is placed over the entrance of the storm-sewer, by which gross matter is kept from flowing into the sewer. The arrangement of the S-traps in the siphons prevents air being drawn into or escaping out of the sewers by the catch-basins.

In Fig. 11 is shown a mode of joining sections of cast-iron pipe flexibly. A ball, $b^4$, formed on one end of a section is received into the socket B$^2$ of the next section. The socket B$^2$ is made in the two sections $c^4$ and $d^4$ with a packing of rubber between them, united by flanges and bolts to permit the connecting or disconnecting of the sections. I employ this pipe to deliver effluence in places not accessible for ordinary digging and pipe-laying—as, for instance, to carry the effluence-delivery far out into the bay or harbor.

Having thus fully described my invention, what I claim, and desire to secure by Letters Patent, is—

1. The combination of the sewer, the group of precipitating-tanks, the chimney, the heating-chamber, and the drying-floor thereover, rotating about the chimney, as set forth.

2. The combination, with the main sewer or sewers, the furnace, and the circular heating-pipe under the drying-floor, of one or more air-ducts $m$, as and for the purpose specified.

3. The combination of the sewer, the air-pump, the basins and chimney, and the drying-chamber, as set forth.

4. The combination, with the filth-hoist, of the endless belts and the drying-floor, as set forth.

5. The combination, with the circular heating-pipe, of the rotating drying-floor, substantially as set forth.

6. The combination, with the rotating drying-floor, of the compressing-rolls and their straining-belts, as and for the purposes set forth.

7. The device for separating the liquid sewage from the solid, comprising the two inclined series of rollers and their straining-belts, as set forth.

8. The combination of the two inclined series of rollers and their belts arranged out of level, the end closures, the hopper, and the chute, as set forth.

9. The combination, with device for separating the liquid sewage from the solid, as described, of the rotating drying-floor and the discharging-belt provided with scrapers, as set forth.

10. The combination, with the sewer and its branches having the check-valves at their termini, of the catch-basin having the S-traps or their equivalent in their connections with the sewers, and the air-tight man-holes, as set forth, and for the purposes specified.

11. The combination of the separating device with the rotating drying-floor and the stirrers or mixers, as set forth.

12. The combination, with the rotating drying-floor, of the fixed circular portion around the chimney, the pipes and rods extending down through the same, and the gates $g^3$, as set forth.

13. The combination, with the precipitating-tanks and effluence-drain, of the adjustably-jointed cast-iron pipe, as set forth, and for the purposes specified.

14. The combination of the rotating drying-floor, the belt carrying the scrapers, the hopper, and the bag-holder, as set forth.

15. The combination of the basins, the effluence-reservoir $i$, the pumps $c'$ and $e^3$, and their operating means, as set forth.

16. The combination of the motor, the main shaft, the rotating drying-floor, separator, the discharging-belt, the pumps, the mill, and the stirrers, as set forth.

In testimony whereof I have hereunto set my hand.

ROBERT CORSCADEN.

Witnesses:
EUGENE F. YOUNG,
C. H. DROUNE.